W. S. MUMMERY.
PNEUMATIC TIRE.
APPLICATION FILED JUNE 18, 1913.

1,151,604. Patented Aug. 31, 1915.

WITNESSES
INVENTOR
Walter S. Mummery
BY
Raymond A. Parker
ATTORNEY.

UNITED STATES PATENT OFFICE.

WALTER S. MUMMERY, OF MINOT, NORTH DAKOTA.

PNEUMATIC TIRE.

1,151,604.          Specification of Letters Patent.     Patented Aug. 31, 1915.

Application filed June 18, 1913.   Serial No. 774,272.

*To all whom it may concern:*

Be it known that I, WALTER S. MUMMERY, a citizen of the United States, residing at Minot, county of Ward, State of North Dakota, have invented a certain new and useful Improvement in Pneumatic Tires, and declare the following to be a full, clear, and exact description of the same, such as will enable others skilled in the art to which it pertains to make and use the same, reference being had to the accompanying drawings, which form a part of this specification.

My invention relates to pneumatic tires and consists in means for preventing in the use thereof of punctures of the pneumatic tubes in which it is common to create an air pressure sufficient to keep the tire distended in use.

Figure 1:
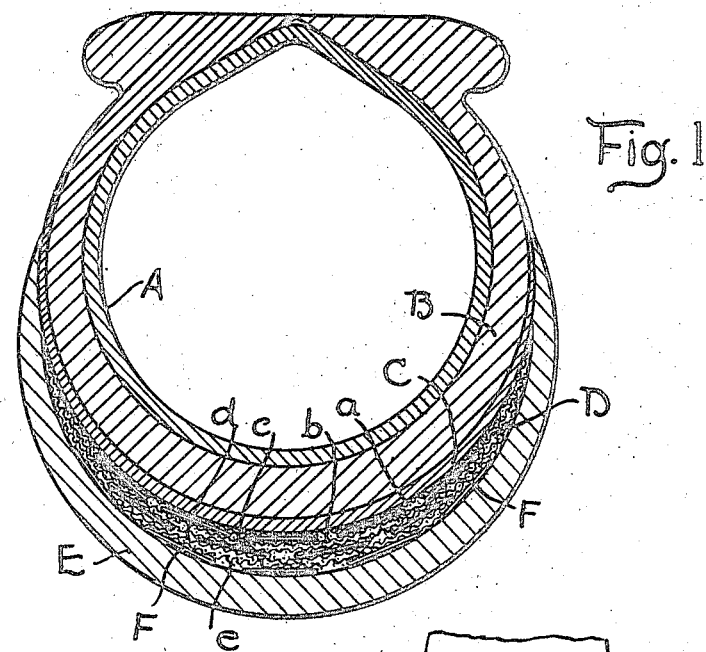
Figure 2:
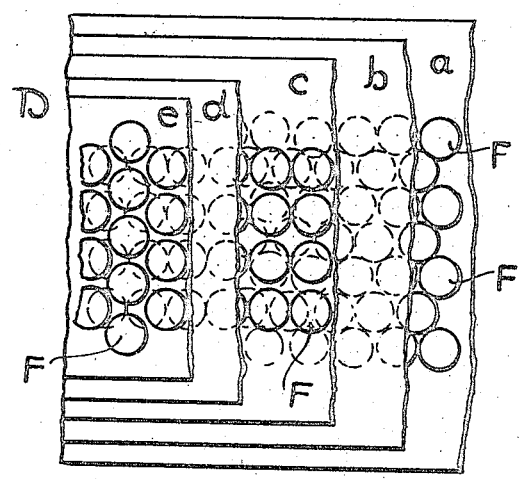
Figure 3:
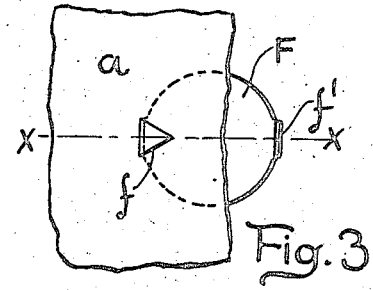
Figure 4:
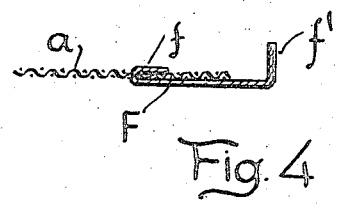

In the drawings—Figure 1 is a section of the tire constructed according to my arrangement and showing the various component parts thereof. Fig. 2 is a detail plan view of the armored layers which are inserted under the tread of the tire for the purpose of preventing punctures as stated. Fig. 3 is a detail view showing the manner of holding the armor plates. Fig. 4 is a detail sectional view on line X—X, Fig. 3, of the manner of fastening plates to the fiber strips which carry them.

In the drawings similar letters refer to similar parts.

I have shown in Fig. 1 a common clencher tire, although it is obvious that my invention is applicable to any form of pneumatic tire of the ordinary two-piece type, to-wit,—an inner tube to retain the air and an outer casing which carries the tread.

In the drawings, A is the inner elastic tube, B is the fiber element which is usually termed the carcass and upon which the bursting strength of the tire depends.

C is the usual layer of soft rubber termed the "cushion" and is vulcanized to the fiber layer B.

D is the special construction of a breaker strip, so-called, in which my invention resides and which is more fully described hereinafter.

E is the tread consisting usually of hardened but elastic rubber adapted to receive the wear of the road.

In Fig. 2 are shown the details of the armored breaker strip D. This consists in my invention of several layers or thicknesses of strong woven fiber or fabric $a$, $b$, $c$, $d$, $e$, and may be of any number thereof as desired of the manufacture. I have shown five of such layers. Layer $a$, which is next to the cushion C, carries upon its outer surface, as compared with the inner part of the tire, a series of metal disks F, F. Although I do not limit myself to the exact shape of this disk, which might be oval or even consist of parallelograms of any other proper shape, it is preferable that the edges be not angled. These disks are fairly closely arranged, as shown in Fig. 2, on strip $a$ and are attached to said strip by ears or lips $f$, $f'$ which pass through the strip and are clenched down, as shown at $f$, in Fig. 3, the latter figure being the under side view of the disk and strip $a$. At $f'$ I have shown one of those lips without being clenched as illustrated in Fig. 4. After this strip is constructed another breaker strip $b$ is cemented to and covers the metal disks $f$, $f$. Upon $b$ is cemented a similar layer of fibrous material $c$ which also carries disks in exactly the same manner as that of $a$, but arranged so as to cover the vacant places left in the arrangement of the disk upon $a$ so that the disk on $c$ will, as shown in Fig. 2, break joints with those of $a$. Over this layer $c$ there is cemented a covering of fibrous material $d$, and a similar strip $e$ may be cemented upon $d$,—$e$ also carrying similar disks F, F attached thereto exactly in the same manner as I have described in regard to $a$. The description in regard to $a$ answers for a description of all the layers carrying the disks. It is obvious that as many of these layers may be arranged as is desired. In the illustration I have shown three fibrous layers carrying armored disks F, F with two intermediate fibrous layers $b$, $d$ which do not carry disks.

An important feature of my invention is that the armored strip D is broken up or made up of layers of fibrous material alternately arranged with the interposed layers of non-fibrous material. The armored plates on the layers respectively are intended to cover and break joints with the openings that are left by the under armored layer in the arrangements of the disks thereon, so that the total arrangement and combination affords a perfect armored but flexible shield to the underlying carcass of the tire and the inner pneumatic tube which seals the compressed air.

While I have shown the armor only encircling substantially the tread of the tire, it is obvious that this armor may be carried down the sides of the tire so far as may be deemed necessary or as is the option of the builder of the tires.

I am aware that plates of metal, in circular or other form, have been inserted in layers in the cushion strip C and perhaps in the tread E, but such construction does not anchor the disks, nor are they so placed that they may be readily removed from the tire and repairs made; and further, when the tire is worn down to the strip carrying these plates, they are immediately stripped therefrom.

In my arrangement, if any portion or the whole of any of the armored strips becomes damaged, the damaged strip may be separated, by means well known to tire repairers, from the underlying strips and new ones, or sections, inserted or cemented down in place preparatory to vulcanizing a tread E over the whole of the tire.

Having thus described my invention, what I desire to claim is:

An armored tire comprising a fabric carcass having a covering on its tread of soft rubber, said covering being thickened at the periphery and tapering to the edges thereof, which edges terminate short of the beads of the carcass, a fabric strip having a multitude of disk-shaped metallic members arranged edge to edge on the front face thereof, and having retaining means penetrating the fabric and engaging the rear surface thereof so as to contact with said soft rubber covering, whereby the metallic members are fixedly secured in place, a second fabric strip cemented directly to the metallic members and to the first mentioned strip, a like-armor strip connected to the second strip, a covering strip connected to said like-armor strip, and a yielding tread portion on the outer surface of the tire overlying the last mentioned covering strip, the edges of which yielding tread portion terminate short of the side edges of the soft rubber covering.

In testimony whereof, I sign this specification in the presence of two witnesses.

WALTER S. MUMMERY.

Witnesses:
R. A. PARKER,
VIRGINIA C. SPRATT.